W. G. SHELTON.

SEWING MACHINE MOTOR.

APPLICATION FILED NOV. 25, 1919.

Reissued Feb. 22, 1921. 15,051.

Inventor:

William Gentry Shelton

By Attys

Fraser Turk & Myers

UNITED STATES PATENT OFFICE.

WILLIAM GENTRY SHELTON, OF NEW YORK, N. Y.

SEWING-MACHINE MOTOR.

15,051. Specification of Reissued Letters Patent. Reissued Feb. 22, 1921.

Original No. 1,247,732, dated November 27, 1917, Serial No. 166,787, filed May 7, 1917. Application for reissue filed November 25, 1919. Serial No. 340,640½.

*To all whom it may concern:*

Be it known that I, WILLIAM GENTRY SHELTON, a citizen of the United States of America, residing in the borough of Manhattan, city, county, and State of New York, have invented certain new and useful Improvements in Sewing-Machine Motors, of which the following is a specification.

The object of this invention is to provide an electric sewing machine motor continuously rotatable in one direction which is so mounted as to be capable of rotating the driving wheel of sewing machines in both directions. A further object of the invention is to provide a small high-speed motor for this purpose.

In the accompanying drawings one practicable embodiment of the invention is illustrated, in which drawings—

Figure 1:
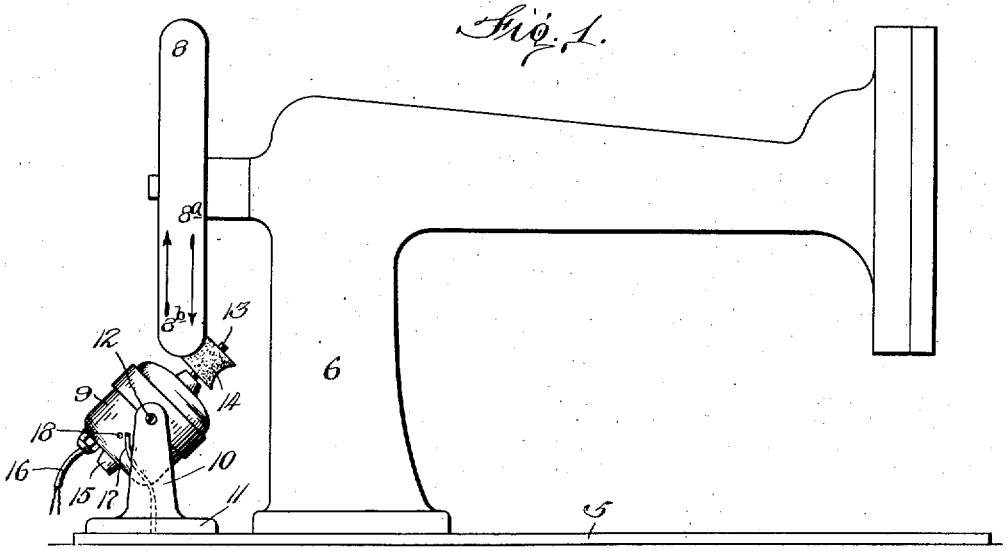
Figure 2:
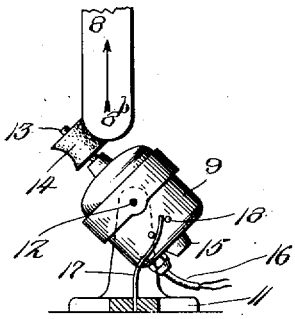
Figure 3:
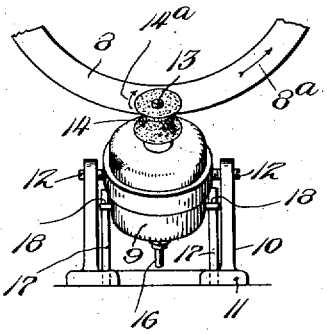

Figure 1 shows my improved motor in elevation, applied to the driving wheel of a sewing machine, the outline of such driving wheel, sewing-machine arm and table being shown in this view;

Fig. 2 is a view showing the motor in elevation, part of its frame being broken away and its pulley applied to the pulley or driving wheel of a sewing machine, the point of application being on the side opposite to that represented in Fig. 1, and Fig. 3 is an elevational view of the motor and a portion of the pulley or driving wheel at substantially right angles to that of Fig. 1, looking at this from the right-hand side.

Considerable difficulty has been experienced in sewing-machine motors heretofore in use owing to the fact that some sewing machines are driven in one direction of rotation and some in the other at the point of application of the electric driver. This has necessitated the use of reversing switches, or, in some instances, shifting the pulley from one end of the armature shaft to the other. A motor built according to my improvement is capable of application, without any change in its working parts whatsoever, to either side of the driving pulley of the sewing machine for the purpose of effecting drive in opposite directions. Certain of the parts of a sewing machine are shown in outline in the drawings, there being a table 5 shown supporting a conventional form of head 6 in which is mounted a horizontally disposed shaft 7 carrying a wheel 8. This wheel, as is well known, is called by various names, according to the viewpoint of the one mentioning it. It serves the purpose, of course, of a fly-wheel, a hand-wheel, and, in the present connection, a driving-wheel. For the purposes of simplicity this wheel 8 will be referred to as a pulley or driving pulley. The motor casing 9 is shown pivotally mounted upon a standard 10 having a base 11 resting upon, and preferably frictionally engaging, the sewing machine table 5. The pivots 12 are shown connected to the motor casing 9 nearer the pulley end than the other end of the casing whereby the gravity of the casing has a tendency to hold this in an upright position with the armature shaft 13 in a substantially vertical position. A pulley 14 is shown mounted upon the armature shaft 13. This pulley is made of some suitable material to drivingly engage the pulley 8 of the sewing machine. The wheel 8 in most sewing machines is provided with a rounding contour, and the pulley is shown concaved to securely engage and conform to the shape of the member which it engages. It has heretofore been thought necessary to provide a comparatively large low-speed motor for driving a sewing machine by a frictional engagement with the pulley 8. The size of the motor has in some respects controlled the point of application of the driving pulley. I have discovered that a small high-speed motor is very efficient in this connection and that, owing to the smallness of the motor, it is possible to have this located when in use practically under the pulley 8 or between such pulley and the sewing machine table 5. By this means the tractive engagement takes place at the side of the pulley 8 and the motor automatically slows down to the requirement of its use. Of course, the employment of a foot-controlled rheostat in connection with power motors of various kinds is so well known that specific illustration and description in the present instance is unnecessary.

The force of engagement between the pulleys 8 and 14 may be provided for by varying the amount of metal in the lower part of the motor casing, as, for instance, by putting the right amount of metal in the hub 15 at the end of the casing opposite the pulley. A cable 16 leading the current into the motor is also shown entering at the lower end of the casing, which also adds to the tendency of the motor to assume an upright position. In some instances it may be found desirable to apply spring pressure, a convenient form of this being illustrated in the leaf spring 17 secured to the base 11. This spring is shown disposed between a pair of pins 18 carried by the casing so that in whichever position the motor is placed, the spring will exert yielding and uniform pressure, according to the amount of tilting of the shaft of the motor. When in contact with the driving wheel of the sewing machine, the axis of the armature shaft and pulley thereon is inclined.

The operation of this sewing machine motor is as follows: Assuming that the motion of the sewing machine in Figs. 1 and 3 of the illustration is in the direction of the arrow $8^a$ and the motor is built to run as indicated by the arrow $14^a$, from left to right, then the manner of applying the motor is to place the left-hand side of the motor pulley 14 against the right-hand side of the pulley 8 in Fig. 1. The weight of the various parts then has a tendency to bring the pulleys into sufficient driving engagement. This weight, as above explained, can, of course, be augmented in various ways. If it is desired to operate the machine with the motor thus applied, it is merely necessary to permit the proper amount of electric current to enter the motor. If the correct direction of rotation of the sewing machine is in the direction of the arrow $8^b$, the manner of applying the motor is merely to swing it on its pivots 12 and press the right-hand side of the pulley 14 against the left-hand side of the pulley 8, see Fig. 2. This, then, with the driver still running in the same direction, will deliver the correct rotation to the sewing machine. In either of these applications of the motor it will be seen that the motor is capable of occupying a position substantially beneath the pulley 8.

Although but one practicable embodiment of the invention is illustrated, yet it will be apparent that various changes may be made within the scope of the claims without departing from the spirit of the invention.

What I claim is:—

1. A sewing machine motor comprising a support for resting upon and frictionally engaging the table of a sewing machine, an electric motor, pivotally mounted on such support, and means acting upon the motor for causing the armature shaft to normally assume a substantially vertical position, and a pulley carried by the armature shaft for engaging the driving pulley of the sewing machine.

2. A sewing machine motor comprising a support for resting upon and frictionally engaging the table of a sewing machine, an electric motor, rotatable in one direction, and pivotally mounted on such support, and means acting upon the motor for causing the armature shaft to normally assume a substantially vertical position, and a pulley carried by the armature shaft for engaging either side of the driving pulley of the sewing machine for effecting rotation in the desired direction.

3. A sewing machine motor comprising an electric motor, a support to which the motor is pivotally mounted, the pivotal axis being above the center of gravity of the electric motor and the parts being so proportioned that the armature shaft normally assumes a vertical position, and a pulley carried by the armature shaft for engaging the driving pulley of a sewing machine.

4. A sewing machine motor comprising an electric motor rotatable in one direction, a support to which the motor is pivotally mounted, the pivotal point being above the center of gravity of the electric motor and the parts being so proportioned that the armature shaft normally assumes a vertical position, and a pulley carried by the armature shaft for engaging either side of the driving pulley of a sewing machine for effecting rotation in the desired direction.

5. In a sewing machine motor, the combination with an electric motor provided with a casing, a support therefor, pivots carried by the motor casing at a point above its center of gravity and mounted in said support, the armature shaft being adapted to assume a vertical position incident to gravity, and a pulley mounted upon said armature shaft for engaging the driving pulley of a sewing machine.

6. A sewing machine motor according to claim 5, having means acting on the motor casing for augmenting the action of gravity.

7. In combination with the sewing machine motor of claim 5, a spring acting on the casing for urging the armature shaft toward a vertical position.

8. A sewing machine motor comprising a motor having a driving pulley and a support, said motor having a pivotal mounting on said support, said driving pulley having its axis at an incline and adapted to swing to and from the side of the hand wheel of a sewing machine, and means for pressing said motor around its pivotal mounting to press said driving pulley against the driving wheel of a sewing machine on one side of the crown thereof.

9. A sewing machine motor comprising a pivotally mounted motor, with a driving pulley, and means adapted to press said motor around its pivotal axis, in a vertically inclined position, against the driving wheel of a sewing machine the pulley axis and said pivotal axis of the motor substantially intersecting.

10. A sewing machine motor comprising a pivotally mounted motor with a driving pulley and means adapted to press said motor around its pivotal axis, in an inclined position, against either side of the driving wheel of a sewing machine, whereby said driving wheel may be driven in one direction or the other without reversing the direction of rotation of said motor.

11. A sewing machine motor comprising a support and a motor pivotally mounted on said support, said motor having a driving-pulley, and being movable around said pivotal axis to bring said driving pulley against one side or the other of the driving wheel of a sewing machine, whereby said sewing machine driving wheel may be driven in one direction or the other, as may be required, without reversing the direction of rotation of said motor.

12. A sewing machine motor comprising a support and a motor pivotally mounted on said support, said motor having a driving pulley, and being movable around said pivotal axis to bring said driving pulley against one side or the other of the driving wheel of a sewing machine, whereby said sewing machine driving wheel may be driven in one direction or the other, as may be required, said support and motor having a combined weight sufficient to maintain it in frictional contact with the table of a sewing machine during the running of the motor.

13. A sewing machine motor comprising a support, and a motor, a single pivotal connection between said motor and support, and means adapted to press said motor around its pivotal axis, in an inclined position against either side of the driving wheel of a sewing machine, whereby said driving wheel may be driven in one direction or the other without reversing the direction of rotation of said motor.

In witness whereof, I have hereunto signed my name.

WILLIAM GENTRY SHELTON.